United States Patent [19]
Endo et al.

[11] Patent Number: 6,106,435
[45] Date of Patent: Aug. 22, 2000

[54] TIE-UP DECISION DEVICE FOR AUTOMATIC TRANSMISSION, AND GEARSHIFT CONTROL APPARATUS EMPLOYING THE SAME

[75] Inventors: Hiroatsu Endo, Susono; Hidehiro Oba, Numazu, both of Japan

[73] Assignee: Toyota Jidosha Kabushiki Kaisha, Toyota, Japan

[21] Appl. No.: 09/227,851

[22] Filed: Jan. 11, 1999

[30] Foreign Application Priority Data

Jan. 14, 1998 [JP] Japan ................................. 10-005321

[51] Int. Cl.[7] .................................................. F16H 61/04
[52] U.S. Cl. ........................... 477/148; 477/154; 477/156
[58] Field of Search .................................... 477/143, 148, 477/149, 154, 155, 156

[56] References Cited

U.S. PATENT DOCUMENTS

| | | | |
|---|---|---|---|
| 3,709,067 | 1/1973 | Ito .......................................... | 477/149 X |
| 3,747,439 | 7/1973 | Uozumi et al. ....................... | 477/143 X |
| 3,832,915 | 9/1974 | Hiramatsu ............................ | 477/143 X |
| 4,073,204 | 2/1978 | Dick ...................................... | 477/155 X |
| 4,653,351 | 3/1987 | Downs et al. . | |
| 5,119,695 | 6/1992 | Milunas et al. ....................... | 477/154 X |
| 5,472,389 | 12/1995 | Ando et al. ........................... | 477/131 X |
| 5,583,768 | 12/1996 | Hamajima et al. ................... | 477/120 X |
| 5,669,849 | 9/1997 | Tabata et al. ......................... | 477/154 X |
| 5,931,885 | 8/1999 | Kubo et al. ........................... | 477/143 X |

FOREIGN PATENT DOCUMENTS

| | | |
|---|---|---|
| 2-37128 | 2/1990 | Japan . |
| 5-296323 | 11/1993 | Japan . |
| 6-8665 | 2/1994 | Japan . |
| 6-341527 | 12/1994 | Japan . |
| 8-210499 | 8/1996 | Japan . |

Primary Examiner—Charles A Marmor
Assistant Examiner—Ha Ho
Attorney, Agent, or Firm—Oblon, Spivak, McClelland, Maier & Neustadt, P.C.

[57] ABSTRACT

In executing a clutch-to-clutch gearshift based on the release and engagement of two clutches by the control of the hydraulic pressures of the clutches, the fluctuating magnitude of the output shaft r.p.m. (No in FIG. 2) of the automatic transmission is calculated, and the degree of the drag (tie-up) state of the clutches is detected on the basis of the calculated fluctuating magnitude. As a result, the pressure increasing/decreasing timings of the hydraulic pressures of the clutches can be optimized to realize a feedback control or learning control of higher precision.

7 Claims, 9 Drawing Sheets

| | C0 | C1 | C2 | B0 | B1 | B2 | B3 | B4 | F0 | F1 | F2 | AUXILIARY | MAIN |
|---|---|---|---|---|---|---|---|---|---|---|---|---|---|
| N | ○ | | | (○) | | | | | | | | — | — |
| Rev | ● | ○ | ○ | ○ | | | | ○ | | | | HIGH | Rev |
| 1st | ○ | ○ | | | | | | ● | ○ | | ○ | LOW | 1st |
| 2nd | | ○ | | | | | ○ | | ○ | | | LOW | 2nd |
| 3rd | ○ | ○ | | | ● | ○ | | | ○ | | | LOW | 3rd |
| 4th | | ○ | ○ | | | | | | ○ | ○ | | LOW | 4th |
| 5th | | ○ | ○ | ○ | | | | | | | | HIGH | 4th |

TIE-UP DECISION DEVICE FOR AUTOMATIC TRANSMISSION, AND GEARSHIFT CONTROL APPARATUS EMPLOYING THE SAME

BACKGROUND OF THE INVENTION

1. Field of the Invention

The present invention relates to a "tie-up" decision device for an automatic transmission which decides whether or not "tie-up" has occurred. The "tie-up" is defined here that a state where engagement of an engagement side clutch proceeds too fast relatively to the release of a release side clutch, in case of executing a clutch-to-clutch gearshift in which the engagement of the engagement side clutch and the release of the release side clutch proceed concurrently. Also, the present invention relates to a gearshift control apparatus employing the tie-up decision device.

2. Description of the Prior Art

In case of executing any specified gearshift of an automatic transmission, two frictional engagement devices (clutches in a broad sense, each including a brake) must be often engaged and released at the same time, respectively (as a so-called "clutch-to-clutch gearshift"). On this occasion, unless the proceedings of the engagement and release of the respective frictional engagement devices are appropriately synchronized, the torque of the output shaft of the automatic transmission will lower, or the r.p.m. of an engine will blow up.

In such a gearshift control, therefore, it has heretofore been common practice to dispose a one-way clutch which effects a function being substantially equivalent to the function of either of the frictional engagement devices, with the intention of avoiding the drawback as stated above.

However, the method in which the engagement devices are synchronized using the one-way clutch in this manner incurs the problem that the cost of the automatic transmission rises in correspondence with the addition of the one-way clutch. Moreover, the weight of the automatic transmission increases, and the accommodation space thereof enlarges.

In view of such problems, in recent years, attempts to execute the "clutch-to-clutch gearshift" directly without employing the one-way clutch have been actively made again with a background being enhancements in the techniques of various sensors and enhancements in the electronic control techniques of hydraulic control systems.

By way of example, the official gazette of Japanese Patent Application Laid-open No. 37128/1990 discloses a method for coping with the present situation. Herein, the engine r.p.m. during a gearshift operation is monitored. When the engine r.p.m. has blown up (that is, when the engine speed has risen), it is recognized that the frictional engagement devices have fallen into an "underlap state" (in which the proceeding of the engagement lags relatively to that of the release). In contrast, when the engine r.p.m. has lowered, it is recognized that the frictional engagement devices have fallen into an "overlap state" (in which the proceeding of the engagement is too fast relatively to that of the release, and which shall hereinbelow be called the "tie-up" or "tie-up state" as stated at the opening of this specification).

Besides, as a method for deciding the tie-up state, the official gazette of Japanese Patent Application Laid-open No. 341527/1994 disclosesone wherein a time period taken since the beginning of a torque phase till that of an inertia phase is detected so as to decide tie-up when the time period is long.

With such a deciding method, really the blowing-up of the engine r.p.m. can be detected comparatively easily. Regarding the decision of the tie-up, however, only the occurrence of a very long (or intense) tie-up can be decided, that is, the precision of the decision is very inferior. Further, it is naturally impossible to accurately grasp the degree of the tie-up state. In performing a feedback control or a learning control, therefore, an appropriate control is very difficult. Especially in case of utilizing learning corrections in order to optimize the timings of a clutch pressure decrease/increase, the learning gain of the learning control in the direction of clearing the tie-up state cannot be optimized. Therefore, it occurs such a problem as a delay in the clearing of the tie-up state at the initial stage of learning, or as a hunting (the recurrence of slip states and tie-up states) at the later stage of the learning.

Moreover, when the tie-up state has occurred, the torque of the output shaft of the automatic transmission lowers suddenly to give rise to an intense gearshift shock. In some cases, very great load torques act on the individual members of the automatic transmission, and this forms a factor for degrading the durability of the automatic transmission.

SUMMARY OF THE INVENTION

The present invention has been made in view of the problems of the prior art as stated above, and it makes possible to decide (or judge) tie-up state in a clutch-to-clutch gearshift earlier and more exactly, and further to learn or immediately correct (feedback-control) the pressure decreasing/increasing timings of two clutches involved in the gearshift, while the degree of the tie-up state or slip state is being detected, thereby to realize the clutch-to-clutch gearshift through optimal timings of the hydraulic pressure.

It is consequently an object of the present invention that an effective hydraulic-pressure correction control is performed to relieve a gearshift shock and to prevent excessive load torques from acting on the individual members of an automatic transmission, thereby to realize a smooth gearshift and to enhance the durability of the automatic transmission more.

In the present invention, as a promise, a tie-up decision device for an automatic transmission decides whether or not "tie-up" in which the engagement of an engagement side clutch proceeds too fast relatively to the release of a release side clutch has occurred, in case of executing a clutch-to-clutch gearshift in which the engagement side clutch and the release side clutch are simultaneously engaged and released, respectively.

The structure of the present invention accomplishes the object by comprising means for settling a deciding term which extends from the time of a command for the gearshift until a predetermined or specific time period lapses since the beginning of an inertia phase, means for obtaining the fluctuating magnitude of the r.p.m. of the output shaft of the automatic transmission from the values of the output shaft r.p.m. within the settled deciding term, and means for deciding the degree of the tie-up on the basis of the obtained fluctuating magnitude.

Also, the structure of the present invention accomplishes the object by comprising means for settling a deciding term which extends from the time of a command for the gearshift, until the r.p.m. of the input shaft of the automatic transmission falls a predetermined magnitude from the synchronous r.p.m. of the lower-speed-stage side clutch since the beginning of an inertia phase, means for obtaining the fluctuating magnitude of the r.p.m. of the output shaft of the automatic transmission from the values of the output shaft r.p.m. within the settled deciding term, and means for deciding the degree of the tie-up on the basis of the obtained fluctuating magnitude.

The fluctuating magnitude of the output shaft r.p.m. may be obtained in such a way that the absolute value of the difference between an average acceleration within the deciding term and a momentary acceleration, is integrated with respect to time.

An average acceleration within a predetermined time period may be employed as the above average acceleration within the deciding term.

Alternatively, the fluctuating magnitude of the output shaft r.p.m. is obtained by a calculation based on the maximum amplitude of the fluctuation of the output shaft r.p.m.

The tie-up decision device may well further comprise means for deciding whether or not a road surface on which a motor vehicle furnished with the automatic transmission is being driven is bad, so as to render the decision of the tie-up only when the bad-road-surface drive decision means decides that the road surface is not bad. Thus, the sensor system of the motor vehicle can be prevented from malfunctioning and inappropriately deciding the tie-up due to the vibrations of the motor vehicle during the drive thereof.

Besides, the tie-up decision device may well further comprise means for deciding whether or not a sensor for detecting the input shaft r.p.m. or the output shaft r.p.m. is normal, so as to render the decision of the tie-up only when the sensor decision means decides that the sensor is normal. Likewise to the above, the inappropriate decision of the tie-up attributed to the malfunction of the sensor system is less apprehended accordingly.

In a case where the clutch pressure of at least either of the release side clutch and the engagement side clutch is corrected and controlled in accordance with the degree of the tie-up detected in this way, the pressure increasing/decreasing timings of the engagement side clutch and the release side clutch can be optimized to realize a correction control or learning control of higher precision and to realize a smooth gearshift.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be described in detail with reference to the drawings.

The embodiments to be described below concern a tie-up control device for an automatic transmission as decides whether or not a (so-called "tie-up") state in which the engagement of an engagement side clutch proceeds too fast relatively to the release of a release side clutch has occurred, in case of executing a clutch-to-clutch gearshift in which the engagement side clutch and the release side clutch are simultaneously engaged and released, respectively.

Figure 8:
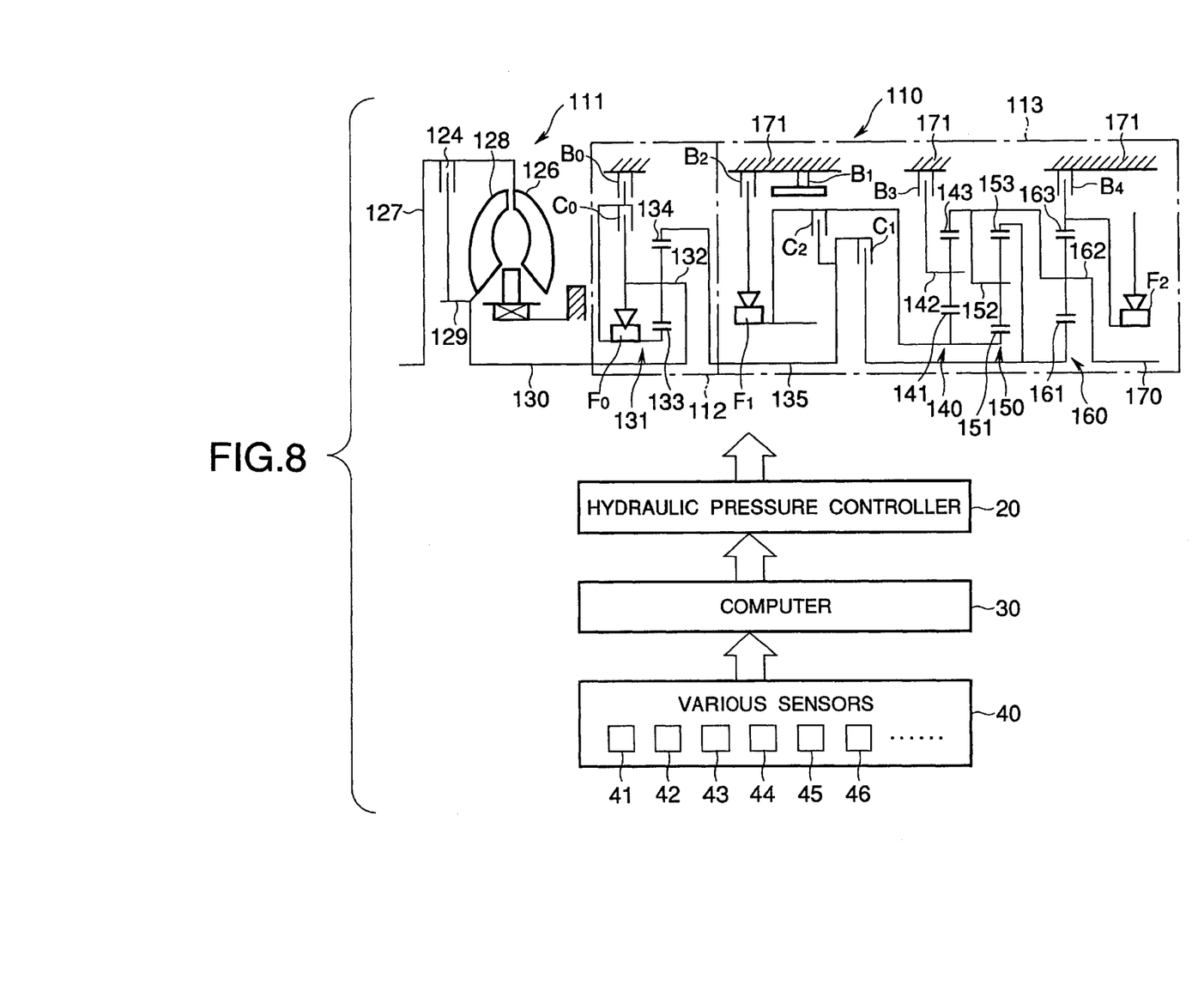
FIG. 8 is a block diagram schematically showing an automatic transmission for a motor vehicle to which the present invention is applied.

FIG. 8 is a skeleton diagram of a tie-up decision device for an automatic transmission according to one embodiment of the present invention. The automatic transmission 110 for a motor vehicle has a torque converter 111, an auxiliary gearshift portion 112 and a main gearshift portion 113.

Subjects for the application of the present invention are not restricted to such an automatic transmission, but the invention is also applicable to an automatic transmission of twin clutch type by way of example.

The torque converter 111 includes a lockup clutch 124. The lockup clutch 124 is interposed between a front cover 127 which is unitary with a pump impeller 126, and a member (hub) 129 on which aturbine runner 128 is integrally mounted.

The crankshaft of an engine (not shown) is connected to the front cover 127. An input shaft (the input rotary shaft of the transmission) 130 connected to the turbine runner 128 is connected to the carrier 132 of a planetary gear mechanism 131 for overdrive constituting the auxiliary gearshift portion 112.

A clutch C0 and a one-way clutch F0 are interposed between the carrier 132 and sun gear 133 of the planetary gear mechanism 131. The one-way clutch F0 is brought into engagement in a case where the sun gear 133 is rotated forward (in the same rotating direction of the input shaft 130) relatively to the carrier 132.

A brake B0 is disposed in order to selectively stop the rotation of the sun gear 133. Besides, a ring gear 134 which is the output element of the auxiliary gearshift portion 112, is connected to an intermediate shaft 135 which is the input element of the main gearshift portion 113.

Regarding the auxiliary gearshift portion 112, in a state where the clutch C0 or the one-way clutch F0 is engaged, the whole planetary gear mechanism 131 is unitarily rotated, and hence, the intermediate shaft 135 is rotated at the same speed as that of the input shaft 130. On the other hand, in a state where the brake B0 is engaged to stop the rotation of the sun gear 133, the ring gear 134 is rotated forward at a speed raised from that of the input shaft 130. In this way, the auxiliary gearshift portion 112 can set the changeover between two, "high" and "low" stages.

The main gearshift portion 113 includes three planetary gear mechanisms 140, 150 and 160, which are interconnected as stated below.

The sun gear 141 of the first planetary gear mechanism 140 and the sun gear 151 of the second planetary gear mechanism 150 are unitarily connected to each other. Also, three constituents; the ring gear 143 of the first planetary gear mechanism 140, the carrier 152 of the second planetary gear mechanism 150 and the carrier 162 of the third planetary gear mechanism 160 are connected to one another. An output shaft 170 is connected to the carrier 162 of the third planetary gear mechanism 160. The ring gear 153 of the second planetary gear mechanism 150 is connected to the sun gear 161 of the third planetary gear mechanism 160.

The gear train of the main gearshift portion 113 can set one reverse stage and four forward stages. In order to realize the stages, clutches and brakes are disposed as stated below.

A clutch C1 is interposed between the intermediate shaft 135, and the ring gear 153 of the second planetary gear mechanism 150 as well as the sun gear 161 of the third planetary gear mechanism 160. Also, a clutch C2 is interposed between the intermediate shaft 135, and the sun gear 141 of the first planetary gear mechanism 140 as well as the sun gear 151 of the second planetary gear mechanism 150.

A brake B1 is arranged for stopping the rotations of the respective sun gears 141 and 151 of the first planetary gear mechanism 140 and the second planetary gear mechanism 150. Besides, a one-way clutch F1 and a brake B2 are arrayed in series between the sun gears 141, 151 and a casing 171. The one-way clutch F1 is engaged in a case where the sun gears 141, 151 are about to be rotated reversely (in the opposite direction to the rotating direction of the input shaft 135).

A brake B3 is interposed between the casing 171, and the carrier 142 of the first planetary gear mechanism 140. As elements for stopping the rotation of the ring gear 163 of the third planetary gear mechanism 160, a brake B4 and a one-way clutch F2 are arrayed in parallel between the ring gear 163 and the casing 171. The one-way clutch F2 is engaged in a case where the ring gear 163 is about to be rotated reversely.

In the automatic transmission 110 explained above, one reverse stage and eight forward stages can be shifted as a hole. The engaging operations of the clutches and the brakes for setting the gearshift stages are tabulated in FIG. 9. Here in FIG. 9, mark ○ indicates an engaged state, mark ● indicates an engaged state in an engine braking mode, and a blank indicates a released state.

Figure 9:
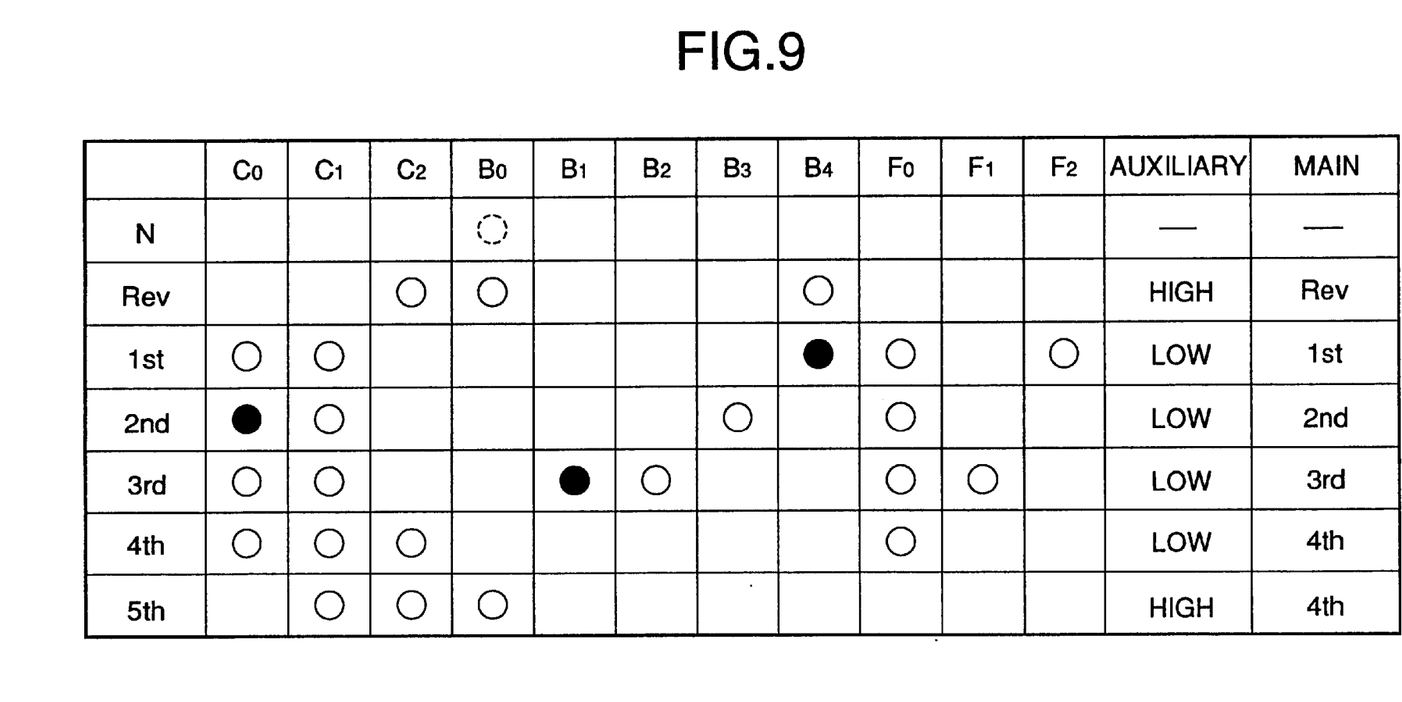
FIG. 9 is a table showing the operating states of the frictional engagement devices of the automatic transmission.

As seen from FIG. 9, the gearshift between the second speed stage and the third speed stage is a clutch-to-clutch gearshift which concerns the brakes B2 and B3.

Referring back to FIG. 8, each of the clutches and brakes is engaged or released in such a way that a solenoid valve or a linear solenoid included in a hydraulic pressure controller (hydraulic pressure control means) 20 is driven on the basis of a command issued by a computer 30. Signals from various sensors 40 are inputted to the computer 30. The signals include, not only basic signals, for example, a vehicle speed signal from a vehicle speed sensor 41 (the signal of the r.p.m. No of the output shaft 170), a throttle opening signal from a throttle sensor 42 (the signal of the opening degree of an accelerator pedal), a pattern select signal from a pattern select switch 43 (a select signal for any of a drive with importance attached to power, a drive with importance attached to fuel consumption, etc. as selected by the driver of the motor vehicle), a shift position signal from a shift position switch 44, and a foot brake signal from a brake switch 45, but also the signal of the r.p.m. of the clutch C0 from a C0 sensor 46. Since the r.p.m. of the clutch C0 equalizes to that of a turbine (the r.p.m. of the input shaft 135 of the automatic transmission) Nt during the gearshift between the second and third speed stages, the turbine r.p.m. Nt can be grasped by detecting the r.p.m. of the clutch C0.

Incidentally, regarding the hydraulic pressure controls for the changeover between the brakes B2 and B3, various methods have hitherto been known and shall be omitted here from detailed description. Basically, for each of the brakes B2 or B3, the back pressure of an accumulator disposed in the oil line of the corresponding brake may be controlled by an actuator control valve and a linear solenoid for controlling the valve. Alternatively, a hydraulic pressure in the oil line may be directly controlled by a duty solenoid or the like. By the way, since the release side of the brakes B2 and B3 is subjected to the control of lowering the oil pressure, the quantity of drain from a corresponding hydraulic circuit may well be controlled by a linear solenoid or a duty solenoid.

Figure 1:
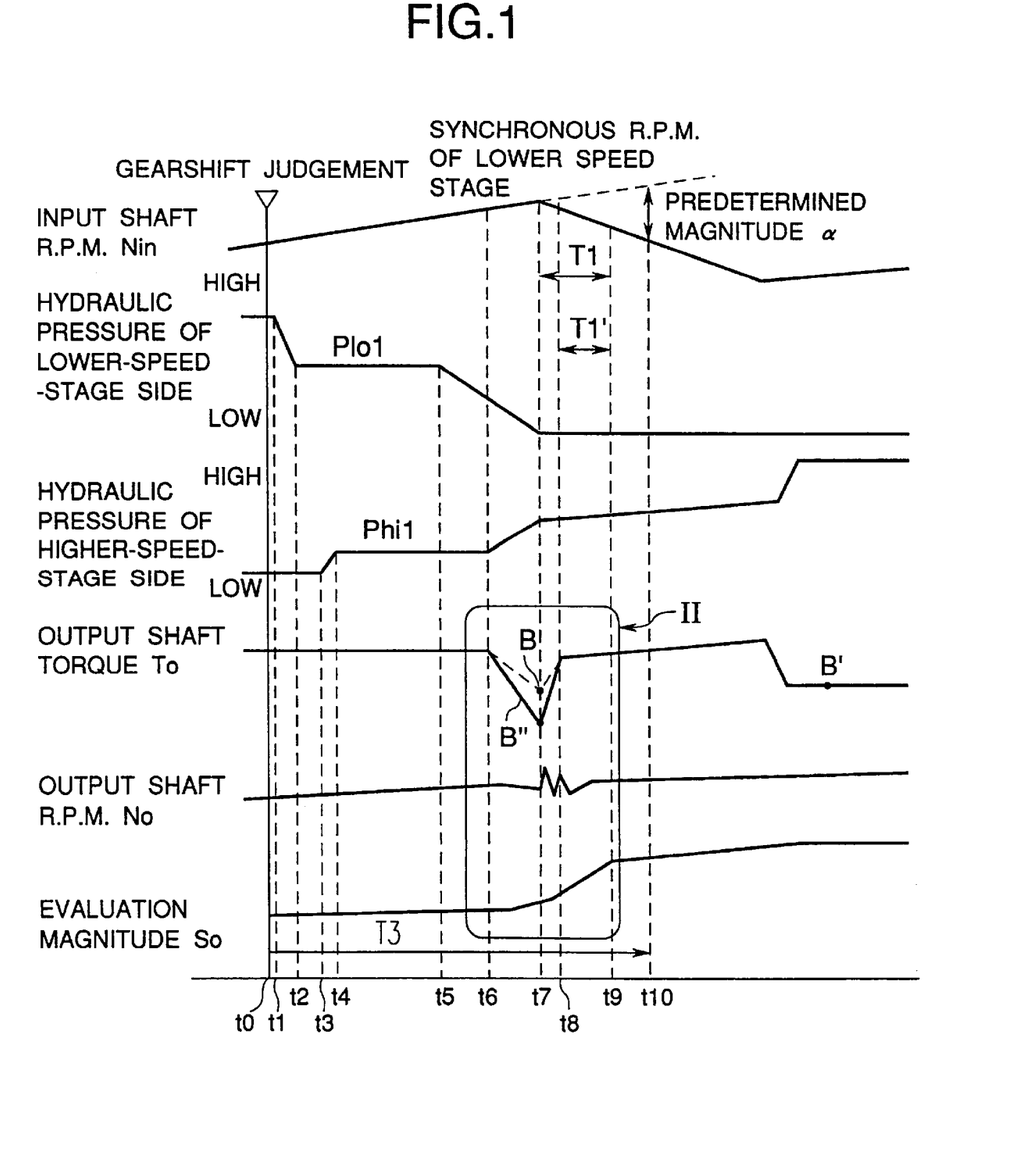
FIG. 1 is a time chart of a gearshift for explaining the detection of the degree of the drag state (tie-up) of clutches in the present invention.

FIG. 1 is a diagram showing various characteristics in the case of detecting the so-called "tie-up state" in which the engagement of an engagement side clutch proceeds fast relatively to the release of a release side clutch in the upshift of a clutch-to-clutch gearshift.

Since the embodiments to be described here pertain to the upshift in a power-ON state, the engagement side clutch corresponds to a clutch on a higher-speed-stage side, and the release side clutch does to a clutch on a lower-speed-stage side.

When the drive state of the motor vehicle to execute the upshift has been judged at a time t0, the hydraulic pressure of the lower-speed-stage side clutch is started falling at a time t1 after a known time period in order to prevent a multiple gearshift. The hydraulic pressure of the lower-speed-stage side clutch is once stopped from falling at a time t2, and is kept at a level Plo1.

On the other hand, the hydraulic pressure of the higher-speed-stage side clutch is started rising at a time t3. It is once stopped from rising at a time t4, and is kept at a level Phi1 at which this higher-speed-stage side clutch has no transmission torque capacity. Meantime, however, the higher-speed-stage side clutch has its pack clearance narrowed (or closed) so as to make preparations for the engagement.

The hydraulic pressure of the lower-speed-stage side clutch is restarted falling at a time t5, while the hydraulic pressure of the higher-speed-stage side clutch is similarly restarted rising at a time t6. Thus, the changeover between the lower-speed-stage side clutch and the higher-speed-stage side clutch begins. On this occasion, when the hydraulic pressure rise (engagement) of the higher-speed-stage side (engagement side) clutch is too fast relatively to the hydraulic pressure fall (release) of the lower-speed-stage side (release side) clutch, the so-called "tie-up state" which is the drag state ascribable to the concurrent engagement of the two clutches takes place.

In the present invention, it is the most important purpose to decide the degree of the tie-up, and the resulting value of the decision is utilized for a feedback control or a learning control.

Figure 2:
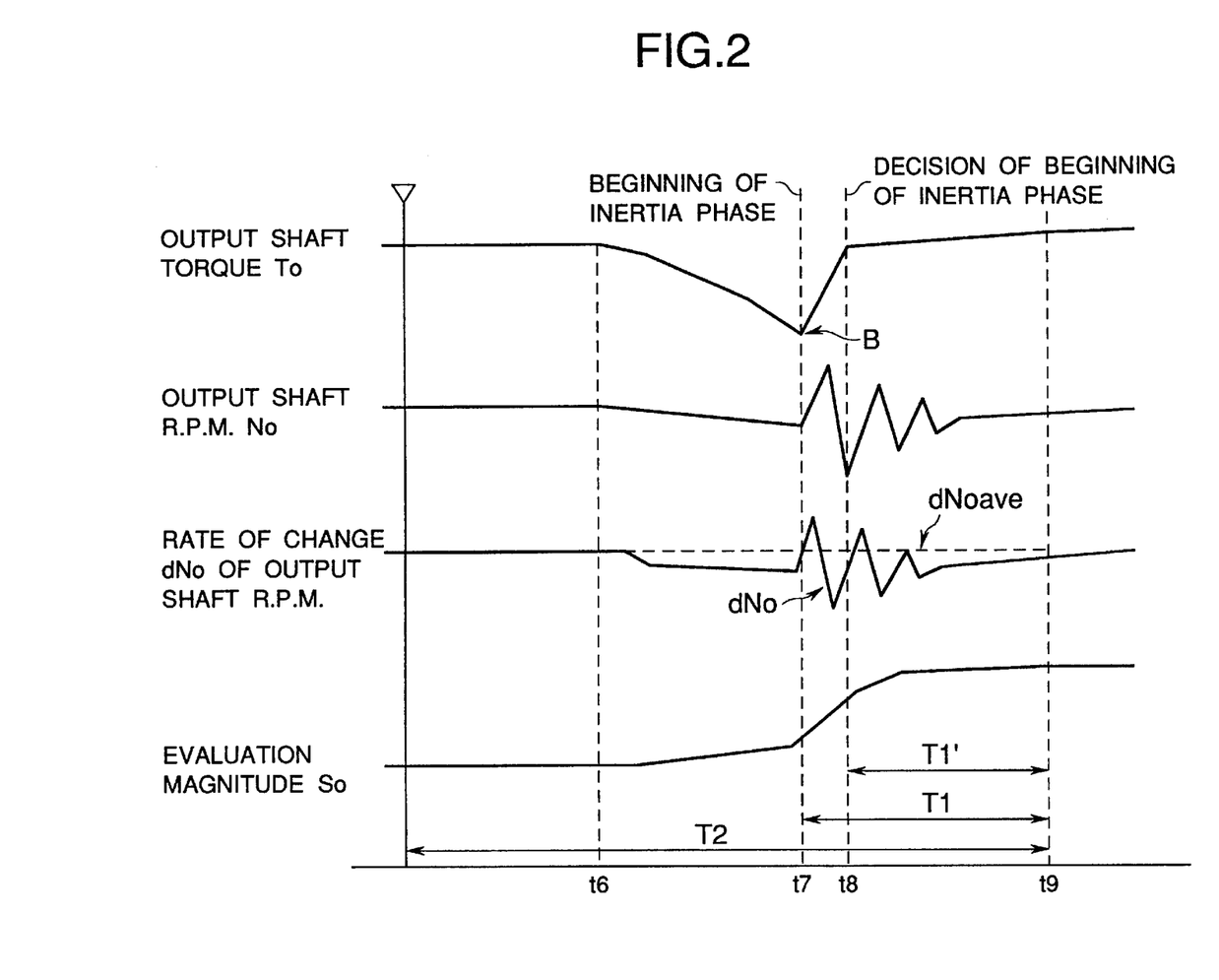
FIG. 2 is an enlarged diagram of the principal part II indicated in FIG. 1.

FIG. 2 is an enlarged view of a part indicated at II in FIG. 1.

There will now be described the first embodiment for deciding the degree of the tie-up stated before.

At substantially the same time that the rise of the hydraulic pressure of the higher-speed-stage side clutch has been restarted at the time t6 (refer to FIG. 1), the, r.p.m. No of the output shaft (170 in FIG. 8) decreases slowly, and also the torque To of this output shaft decreases accordingly. The higher-speed-stage side clutch and the lower-speed-stage side clutch are changed-over at this time.

The lower-speed-stage side clutch has its hydraulic pressure fully drained (refer to FIG. 1) at a time t7. Besides, about that time, the higher-speed-stage side clutch bears all the input torque Tin of the automatic transmission, and the output shaft torque To falls greatly or steeply.

After the time t7, the engagement of the higher-speed-stage side clutch proceeds. When the torque transmitted through the higher-speed-stage side clutch has exceeded a certain level, the rotary members in the automatic transmission start changeover for the alteration of gear ratios (r.p.m. changes for the gearshift), and the gearshift (inertia phase) begins. When the members have begun the r.p.m. changes, the steep fall of the output shaft torque To having arisen till then is removed. Thenceforth, the torque which depends upon the hydraulic pressure exerted on the higher-speed-stage side clutch at that time is transmitted to the output shaft (until the inertia phase ends).

The steep fall of the output shaft torque To as stated before occurs, even in the case of a gearshift which is effected through a one-way clutch, at the point of time at which the one-way clutch has started running idle. Namely, the steep fall always occurs at the point of time at which the torque having been borne by the lower-speed-stage side clutch has been switched-over to the higher-speed-stage side clutch. Basically, this steep fall corresponds to the amount of the alteration of the gear ratios. That is, even in the ideal gearshift, the output shaft torque To falls down to a level B which corresponds to a torque B' (Gear ratio of Higher-speed-stage side×Input torque) to be borne after the gearshift.

In the case of the clutch-to-clutch gearshift, the output shaft torque To falls greatly down to a level B" (indicated in FIG. 1) below the level B' on the occasion where the fall of the hydraulic pressure of the lower-speed-stage side clutch slows to delay the release of this clutch (in the so-called "tie-up state"). The reason therefor is that, on this occasion, an inequality (Input torque Tin<Torque capacity of Lower-speed-stage side clutch+Torque capacity of Higher-speed-stage side clutch) holds, so a surplus torque capacity component urges the power transmission system of the automatic transmission toward its locking side. That is, when the tie-up has arisen in the clutch-to-clutch gearshift, the fall of the output torque To enlarges more in accordance with the degree of the tie-up.

Meanwhile, in general, when a torque falls temporarily, followed by the instantaneous removal of the fall, vibration occurs as a reaction. The vibration tends to enlarge more as the fall is larger. Accordingly, when the state of the vibration of the output shaft is detected as the "fluctuating magnitude of the output shaft r.p.m. No", the degree of the tie-up can be quantitatively detected as a result.

The present invention has been thought out on the basis of this discovery. Namely, the present invention obtains the fluctuating magnitude of the output shaft r.p.m. No, and decides the degree of the tie-up on the basis of the obtained fluctuating magnitude.

Here in this embodiment, in obtaining the fluctuating magnitude of the output shaft r.p.m. No, the rate of change (acceleration) dNo of the output shaft r.p.m. No is found. This rate of change dNo is a value calculated in such a way that the output shaft r.p.m. No of the automatic transmission changing every moment is differentiated with respect to time. Besides, the average rate of change (average acceleration) dNoave of the output shaft r.p.m. No during the gearshift is found. Thereupon, the relationship between both the rates of changes dNo, dNoave is examined.

In FIG. 2, the rate of change dNo of the output shaft r.p.m. No (hereinafter, sometimes simply called the "rate of change dNo") is indicated by a thick line, while the average rate of change dNoave of the output shaft r.p.m. No (hereinafter, sometimes simply called the "average rate of change dNoave") is indicated by a broken line.

Further, in order to decide the degree of the tie-up state, an evaluation magnitude So which is based on the rate of change dNo and the average rate of change dNoave is calculated by the following equation:

$$So = S|dNo - dNoave| \cdot dt \quad (1)$$

Eq. (1) has been found out by the inventor as an equation, which is effective for evaluating the tie-up. It is such that the absolute value of the difference between the average rate of change dNoave and the rate of change dNo is integrated with respect to time.

In Eq. (1), the average rate of change dNoave of the output shaft r.p.m. No is calculated on the basis of the (plurality of) values of the rate of change dNo for a predetermined time period extending from the gearshift command (the time t0).

Herein, the predetermined time period should preferably be set at a time period extending till the beginning of a torque phase (at a time t6), in order that the time period of the torque fall in the tie-up state may not be involved in the average rate of change dNoave.

A term for the integration is set at one (a time period T2) extending from the gearshift command (the time t0) till a time t9 at which a predetermined time period T1 has lapsed since the time t7 of the beginning of the inertia phase. Incidentally, this concretely has the same significance that, since the beginning of the inertia phase is detected at a time t8, the set term expires upon the lapse of a predetermined time period T1' from the time t8.

An example calculated in conformity with Eq. (1) is graphically illustrated as the evaluation magnitude So at the lowermost part of FIG. 2. The larger value of the evaluation magnitude So signifies the higher degree of the tie-up state, whereas the smaller value of the evaluation magnitude So signifies the lower degree of the tie-up state.

The evaluation value So with which the degree of the tie-up state can be quantitatively decided is obtained in this way, and it can be applied to the feedback control or the learning control for the hydraulic pressure of each clutch. Accordingly, the clutch-to-clutch gearshift can be performed more precisely and more smoothly.

Next, the second embodiment for deciding the degree of the tie-up state will be described.

In the foregoing first embodiment, the detecting term for deciding the degree of the tie-up state is set at the term (the time period T2) stated before, extending from the gearshift start command (the time t0) till the time t9 at which the predetermined time period (T1') lapses since the detection of the beginning of the inertia phase (the time t8).

Here in the second embodiment, as indicated in FIG. 1, a detecting term T3 for deciding the degree of the tie-up state is set so as to extend from the gearshift start command (the time t0) till a time t10 at which it is detected that the r.p.m. Nin (turbine r.p.m.) of the input shaft (130 in FIG. 8) of the automatic transmission has fallen a predetermined magnitude α from the synchronous r.p.m. of the lower-speed-stage side.

Also with this measure, the term for deciding the tie-up can be appropriately set as in the first embodiment. The settlement or definite fixation of the deciding term according to the second embodiment is excellent in the point of dispensing with the detection of the beginning of the inertia phase.

Herein, regarding the settlement of the deciding term, essentially the point of time at which some time period lapses since the beginning of the inertia phase may be settled or definitely fixed. It is sometimes allowed to adopt such a contrivance that a timer which is set to expire after the time of the beginning of the inertia phase without fail even in the presence of the manufactural discrepancies of the constituents of the automatic transmission, is directly activated from the gearshift command (a modification to the first embodiment).

Regarding the calculation of an evaluation magnitude So in the second embodiment, the calculation of Eq. (1) mentioned before can be adopted as it is. That is, the degree of the tie-up state may be decided on the basis of the rate of change dNo obtained in the way that the output shaft r.p.m. No is differentiated with respect to time, and in accordance with the evaluation magnitude So obtained in the way that the absolute values of the differences between the average rate of change dNoave and the temporal values of the rate of change dNo are summated with respect to time.

Figure 3:
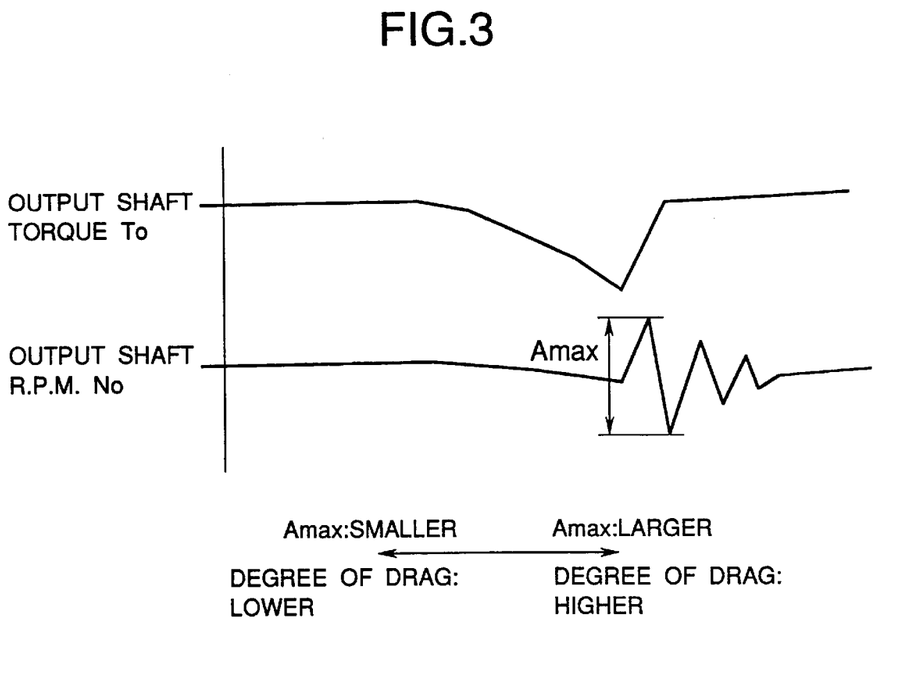
FIG. 3 is a diagram for explaining calculation means for detecting the degree of the tie-up state.

Next, in the third embodiment, an evaluation magnitude for deciding the degree of the tie-up state (the fluctuating magnitude of the output shaft r.p.m. No) is not obtained by the calculation of Eq. (1), but it is obtained by calculation on the basis of the maximum amplitude Amax of the fluctuation of the output shaft r.p.m. No as illustrated in FIG. 3.

Since the output shaft r.p.m. No is changing every moment, the amplitude A of its fluctuation is also changing continually. Herein, the amplitude A of the fluctuation of the output shaft r.p.m. No reflects the magnitude of the vibration of the output shaft (170 in FIG. 8). Therefore, the degree of the tie-up state can be calculated by detecting the maximum amplitude Amax of the output shaft r.p.m. No. Naturally, the larger value of the maximum amplitude Amax of the output shaft r.p.m. No expresses the higher degree of the tie-up state. To the contrary, the smaller value of the maximum amplitude Amax signifies the tie-up state being lighter.

The degree of the tie-up (clutch drag) state thus obtained may be immediately reflected in the later control stage of the current gearshift, or it may well be used in the learning control so as to be reflected in the next gearshift.

Figure 4:
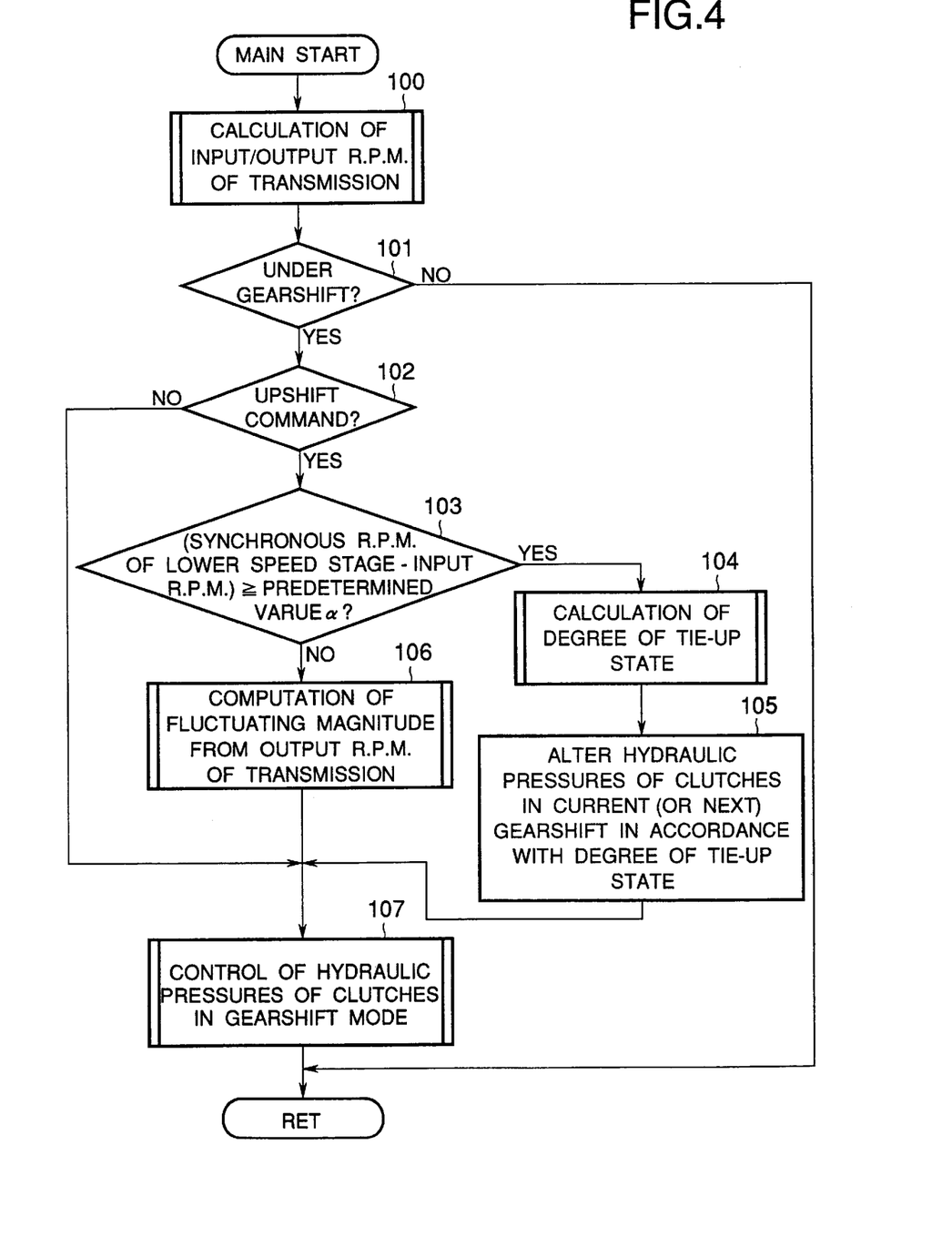
FIG. 4 is a chart showing a control flow in the second embodiment of the present invention.

Next, a control flow for carrying out the second embodiment stated before will be described with reference to FIG. 4.

At a step 100, the input shaft r.p.m. Nin and output shaft r.p.m. No of the automatic transmission are detected (or calculated). At a step 101, whether or not the automatic transmission is under a gearshift is decided on the basis of the detected input/output shaft r.p.m. Nin and No. When it has been decided at the step 101 that the automatic transmission is not under the gearshift, the routine of the control is ended. On the other hand, when it has been decided that the automatic transmission is under the gearshift, the routine advances to a step 102, which functions to decide whether or not the gearshift is of the command of an upshift. If the gearshift is not the upshift, the present invention is not pertinent, and hence, the hydraulic pressures of the clutches in the gearshift mode are controlled by any other control method at a step 107. In contrast, subject to the upshift, a step 103 functions to decide if the difference between the synchronous r.p.m. of the lower speed stage (No×Gear ratio) and the input shaft r.p.m. Nin of the automatic transmission has reached, at least, the predetermined value α. In a case where the difference is greater than or equal to the predetermined value α, the routine advances to a step 104, at which the degree of the drag (tie-up) of the clutches is calculated in conformity with Eq. (1) mentioned before.

Further, at a step 105, the balance between the increase of the hydraulic pressure of the engagement side clutch and the decrease of that of the release side clutch in the gearshift being currently executed is altered in accordance with the calculated degree of the tie-up state. Incidentally, the content of the step 105 may well be replaced with "Alter the variables or parameters for the hydraulic pressure control in the next gearshift" so as to perform the learning control for the next gearshift.

Besides, in a case where the difference is less than the predetermined value α at the step 103, the fluctuating magnitude is computed from the output shaft r.p.m. No of the automatic transmission at a step 106, followed by the control of the hydraulic pressures of the clutches at the step 107.

By the way, although the control flow of the first embodiment is not especially illustrated, merely the step 103 for settling or definitely fixing the term for deciding the degree of the drag of the clutches may be changed to the decision of "if the predetermined time period (T1) has lapsed since the beginning of the inertia phase (t7) in the current gearshift", with the other steps of the control flow left intact.

Further, in case of performing the third embodiment, the control flow may be left intact with the mere alteration of calculating the fluctuating magnitude of the output shaft r.p.m. No at the step 104 on the basis of the maximum amplitude Amax within the deciding term, not by Eq. (1).

Meanwhile, in a case where any of the embodiments of the present invention is practicably performed, conditions to be explained below should more preferably be further taken into consideration.

The first condition is if a road surface on which the motor vehicle is being driven is bad (for example, if the road surface is slippery). In this case, any embodiment of the present invention is performed only when it is decided that the road surface is not bad.

Incidentally, the "bad road surface" comprehends an abnormal state where a tire is liable to slip or is slipping, a case where vibrations ascribable to the ruggedness of the road surface are transmitted to the motor vehicle, and so forth.

The reason why the present invention is not performed on such a bad road surface, is as explained below. In the state where the tire (wheel) is slipping, the wheel merely idles and does not actually move forward in accordance with the trodden amount of an accelerator pedal. Therefore, the detection of the fluctuating magnitude of the output shaft r.p.m. No of the automatic transmission becomes unreliable, and the tie-up of the clutches in the execution of the gearshift sometimes fails to be appropriately decided. Besides, a similar situation takes place during the drive of the motor vehicle on a gravel road or the like. Further, the possibility of erroneous detection by the sensor for the output shaft r.p.m. No heightens due to the vibrations.

The second condition is if the respective sensors for detecting the input shaft r.p.m. Nin and the output shaft r.p.m. No are both operating normally. In this case, the control for deciding the degree of the tie-up state according to the present invention is performed only when the sensors are decided normal.

Thus, in such a case where the r.p.m. of the input shaft or output shaft of the automatic transmission has been erroneously indicated as a value different from an actual one or as zero on account of the trouble of the sensor, the inappropriate decision of the tie-up of the clutches is preventable.

Figure 5:
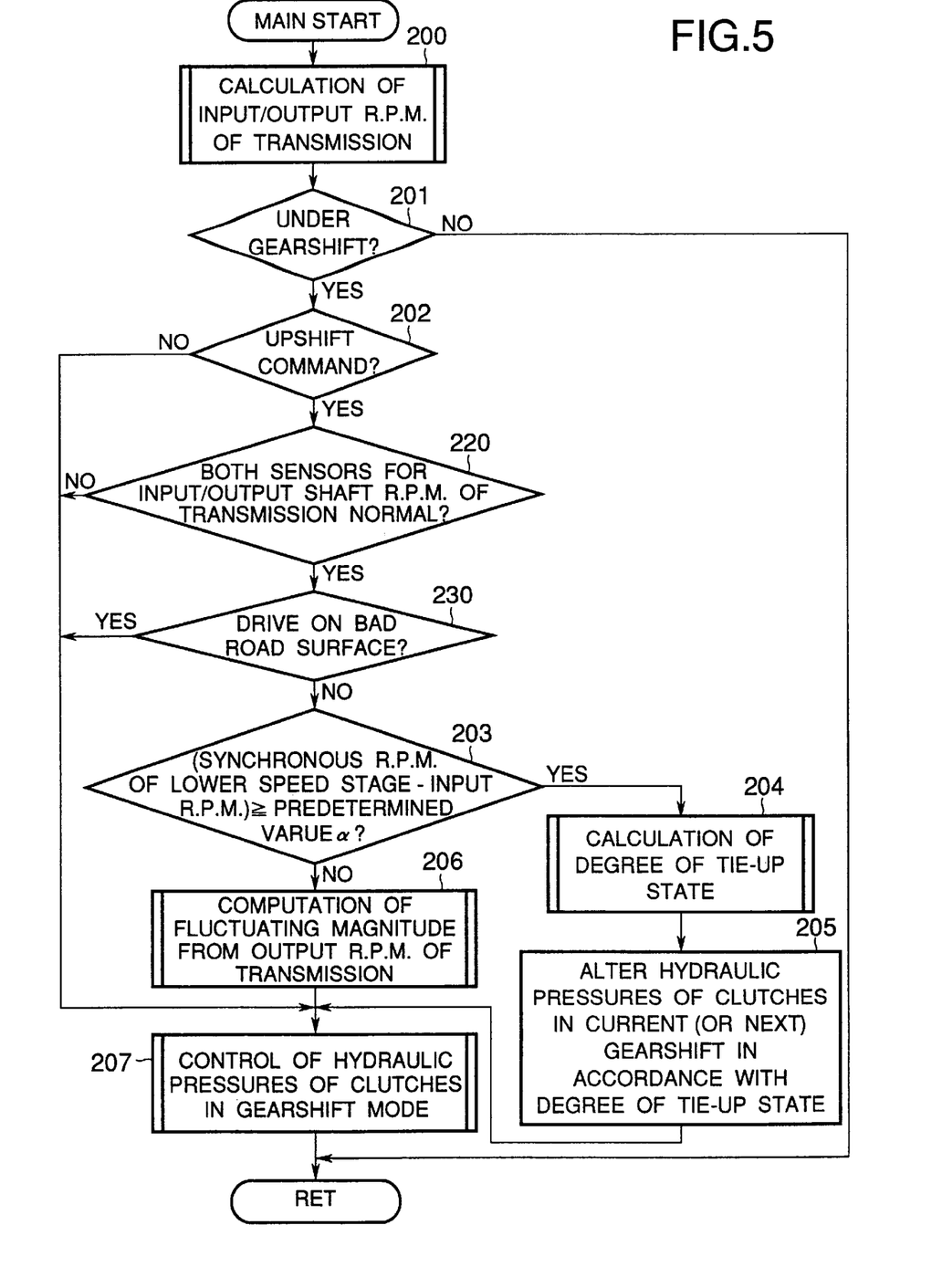
FIG. 5 is a chart showing a control flow in which additional conditions are imposed on performing the present invention.

FIG. 5 is a chart showing a control flow in the case where the first and second conditions are additionally considered in the second embodiment of the present invention. The control flow is such that steps 220 and 230 are inserted between the steps 102 and 103 mentioned in FIG. 4. More specifically, the step 220 serves to decide whether or not the sensors for the input and output shaft r.p.m. values of the automatic transmission are normal, as the second condition, while the step 230 serves to decide whether or not the motor vehicle is being driven on the bad road surface, as the first condition. Since the other steps are the same as in the control flow shown in FIG. 4, reference numerals each of which has two lower digits identical to those in FIG. 4 are respectively assigned to the same steps and shall not be repeatedly explained here.

Figure 6:
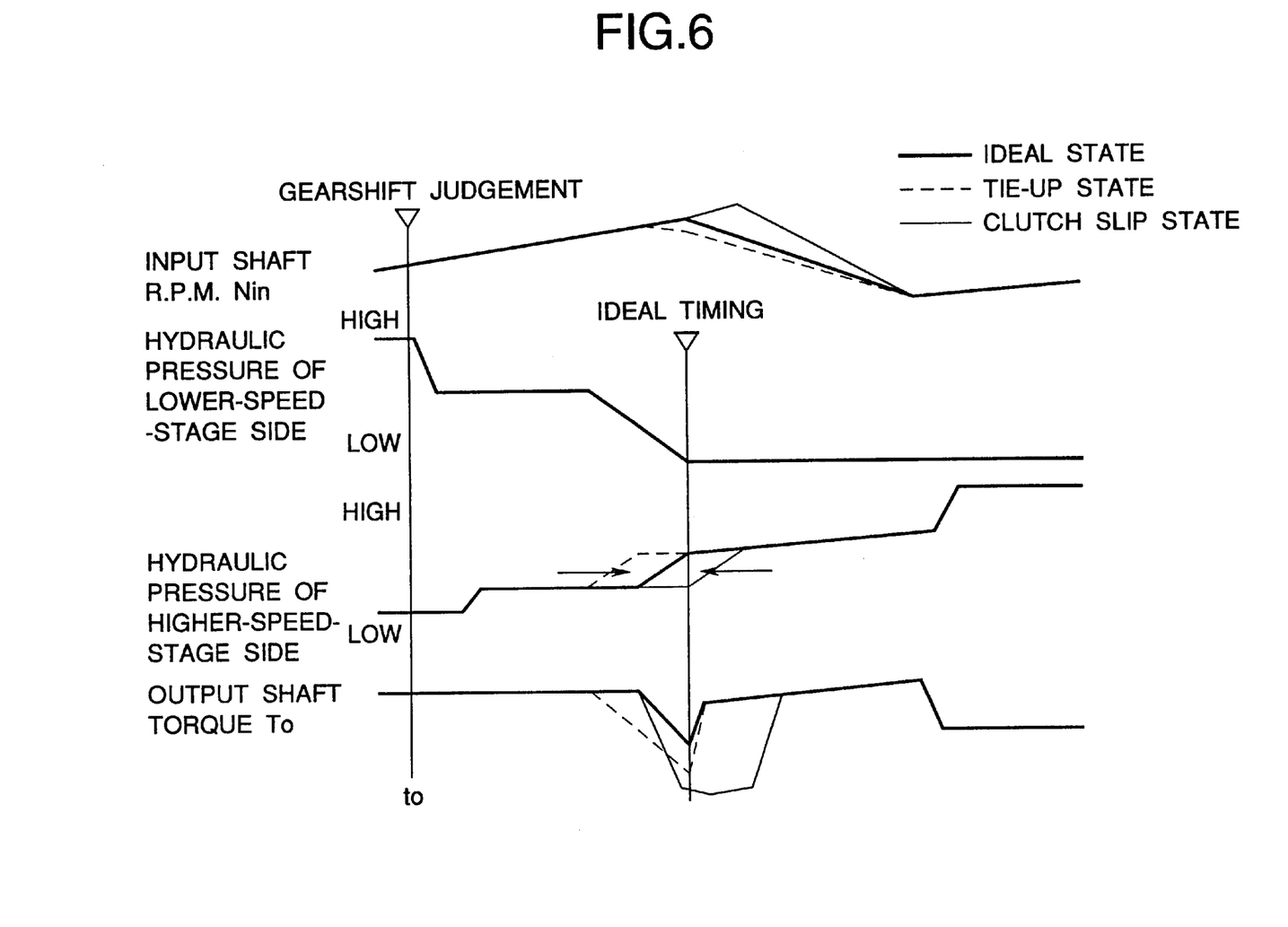
FIG. 6 is a diagram showing the differences between the timings of the increase/decrease of clutch pressures in the case of performing the present invention and based on a prior-art control.
Figure 7:
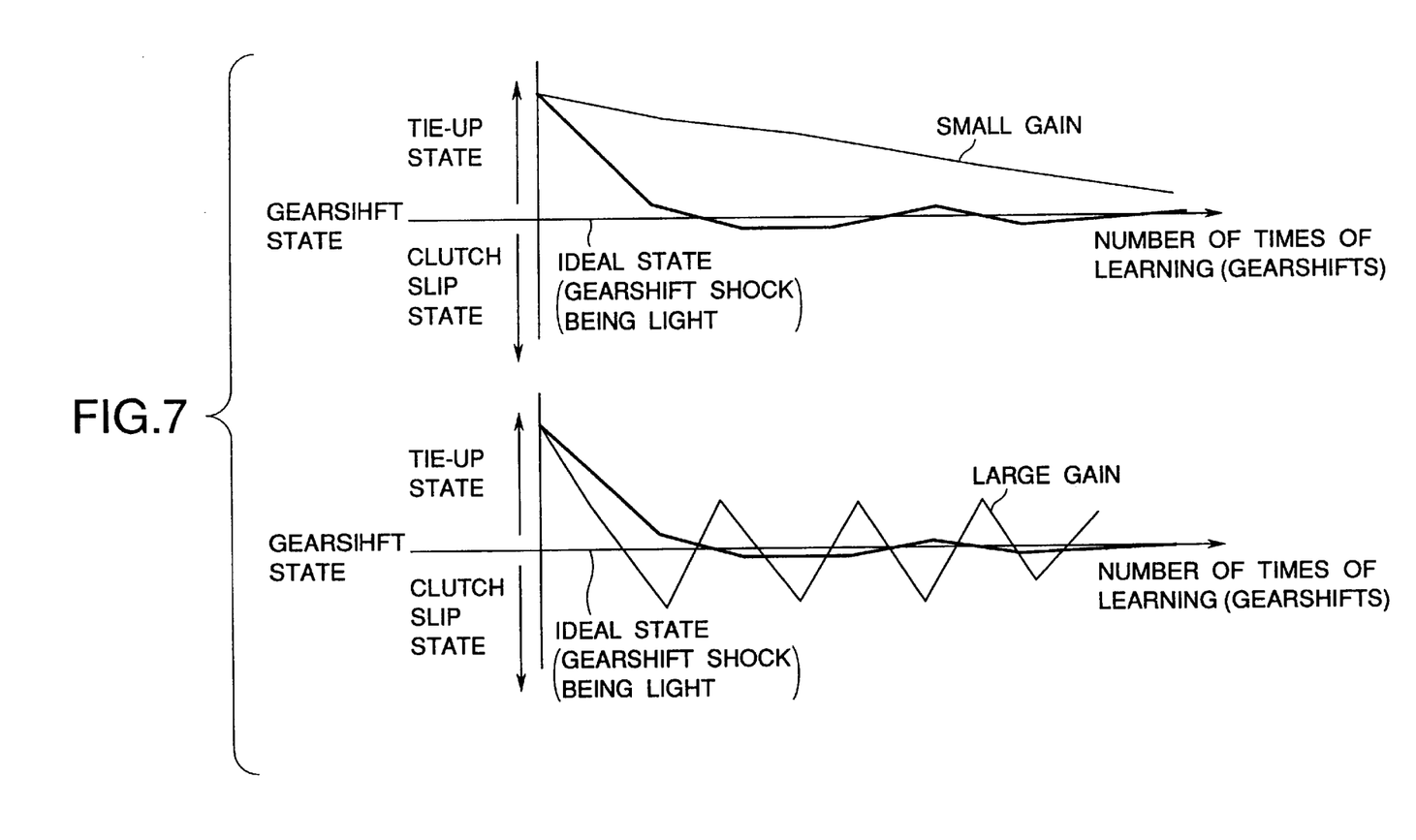
FIG. 7 is a diagram showing the differences between gearshift characteristics depending upon a learning gain, in the case of performing the present invention and based on the prior-art control.

When the degree of the tie-up state is decided by performing the present invention in this manner, the gearshift comes near to an ideal state as indicated by thick lines in FIGS. 6 and 7. In a case (indicated by broken lines) where the gearshift is apt toward the tie-up state (the drag of the clutches), the learning control for the next gearshift, for example, can be performed as indicated by the thick solid lines, owing to the decision according to the present invention.

By the way, the so-called "underlap state" (indicated by fine lines), which arises when the engagement of the higher-speed-stage (engagement) side clutch is too late relatively to the release of the lower-speed-stage (release) side clutch contrariwise to the situation of the tie-up state, can be satisfactorily decided even by the prior-art method as explained before. Therefore, when the known method is conjointly used, the gearshift can be brought near to the ideal state (indicated by the thick lines) in both the cases of the tie-up state and the underlap state. Thus, the steep fall of the output torque To can be suppressed to smoothen the gearshift.

With the prior art, it is impossible to quantitatively detect the degree of the tie-up state. In the case of performing the learning control, therefore, the gain thereof cannot be set large as indicated by the fine line in the upper column of FIG. 7, so that the tie-up state is not cleared soon, and the state in which the gearshift shock is heavy, often continues for long in spite of the larger number of times of learning. The reason why the gain is inevitably set small is that, if the gain is set large as indicated by the fine line in the lower column of FIG. 7, although the tie-up state can be corrected greatly in a desirable direction at first, the hunting between the tie-up state and the underlap state is thereafter caused by the excessive correction. In contrast to the prior art, according to the present invention, it is possible to quantitatively detect the degree of the tie-up state. Therefore, the tie-up decided to be at a higher degree can be corrected more, whereas the tie-up decided to be at a lower degree can be corrected less. Accordingly, the ideal state indicated by the thick line can be approached with a small number of times of learning without incurring the hunting.

As described above, according to the present invention, when the tie-up has occurred in which the engagement of a higher-speed-stage (engagement) side clutch proceeds too fast relatively to the release of a lower-speed-stage (release) side clutch, the degree of the state of the tie-up can be detected and evaluated accurately and quantitatively. Accordingly, the fluctuation of an output shaft torque can be suppressed. Moreover, the obtained degree of the tie-up state can be effectively utilized for a gearshift control in which a feedback control or a learning control is performed. Thus, a smooth gearshift is realized.

What is claimed is:

1. A tie-up decision device for an automatic transmission which decides whether or not tie-up in which engagement of an engagement side clutch proceeds too fast relative to release of a release side clutch has occurred, in case of executing a clutch-to-clutch gearshift in which the engagement side clutch and the release side clutch are simultaneously engaged and released, respectively, comprising:

means for setting a deciding term which extends from a time of a command for the gearshift, until r.p.m. of an input shaft of the automatic transmission falls a predetermined magnitude from synchronous r.p.m. of a lower-speed-stage side since beginning of an inertia phase;

means for obtaining a fluctuating magnitude of r.p.m. of an output shaft of said automatic transmission from values of the output shaft r.p.m. within the set deciding term; and means for deciding the degree of the tie-up on the basis of the obtained fluctuating magnitude.

2. A tie-up decision device for an automatic transmission as defined in claim 1, wherein the fluctuating magnitude of said output shaft r.p.m. is obtained in such a way that an absolute value of a difference between an average acceleration of the output shaft r.p.m. and a momentary acceleration of the output shaft r.p.m. within the deciding term is integrated with respect to time.

3. A tie-up decision device for an automatic transmission as defined in claim 2, wherein the average acceleration within said deciding term is the average acceleration within a predetermined time period which extends from the time of the gearshift command.

4. A tie-up decision device for an automatic transmission as defined in claim 1, wherein said fluctuating magnitude of said output shaft r.p.m. is obtained by a calculation based on the maximum amplitude of a fluctuation of said output shaft r.p.m.

5. A tie-up decision device for an automatic transmission as defined in claims 1, further comprising means for deciding whether or not a road surface on which a motor vehicle furnished with said automatic transmission is being driven is abnormal, so as to render the decision of said tie-up only when said abnormal-road-surface drive decision means decides that the road surface is not abnormal.

6. A tie-up decision device for an automatic transmission as defined in claim 1, further comprising means for deciding whether or not respective sensors for detecting the input shaft r.p.m. and said output shaft r.p.m. are both normal, so as to render the decision of said tie-up only when the sensor decision means decides that both the sensors are normal.

7. A gearshift control apparatus for an automatic transmission, comprising:

the tie-up decision device for the automatic transmission as defined in claims 1; and means for correcting and controlling a clutch pressure of at least either of said release side clutch and said engagement side clutch in accordance with said degree of said tie-up detected using said tie-up decision device.

* * * * *